United States Patent
Wu et al.

(10) Patent No.: US 10,087,629 B2
(45) Date of Patent: Oct. 2, 2018

(54) SEISMIC STEEL TUBULAR COLUMN WITH INTERNAL LOCAL RESTRAINT AND FILLED WITH HIGH-STRENGTH COMPOUND CONCRETE CONTAINING NORMAL-STRENGTH DEMOLISHED CONCRETE LUMPS AND CONSTRUCTION PROCESS OF SUCH COLUMN

(71) Applicant: SOUTH CHINA UNIVERSITY OF TECHNOLOGY, Guangdong (CN)

(72) Inventors: Bo Wu, Guangdong (CN); Qiang Zhang, Guangdong (CN)

(73) Assignee: SOUTH CHINA UNIVERSITY OF TECHNOLOGY, Guangdong (CN)

( * ) Notice: Subject to any disclaimer, the term of this patent is extended or adjusted under 35 U.S.C. 154(b) by 0 days.

(21) Appl. No.: 15/512,069

(22) PCT Filed: Oct. 24, 2014

(86) PCT No.: PCT/CN2014/089384
§ 371 (c)(1),
(2) Date: Mar. 17, 2017

(87) PCT Pub. No.: WO2016/041237
PCT Pub. Date: Mar. 24, 2016

(65) Prior Publication Data
US 2017/0254083 A1 Sep. 7, 2017

(30) Foreign Application Priority Data
Sep. 17, 2014 (CN) .......................... 2014 1 0475336

(51) Int. Cl.
E04C 3/34 (2006.01)
E04C 3/32 (2006.01)
(Continued)

(52) U.S. Cl.
CPC .................. *E04C 3/32* (2013.01); *B28B 1/08* (2013.01); *B28B 1/16* (2013.01); *C04B 18/16* (2013.01);
(Continued)

(58) Field of Classification Search
CPC . C04B 18/00; C04B 18/02; E04C 3/34; E04C 3/20; E04C 3/293
(Continued)

(56) References Cited

U.S. PATENT DOCUMENTS 5,852,905 A * 12/1998 Collina .................. B28B 23/06
29/897.35
2008/0060298 A1 * 3/2008 Fahim ...................... E04C 5/07
52/309.14

FOREIGN PATENT DOCUMENTS

CN 101054275 10/2007
CN 101418629 * 4/2009 ............... E04C 3/20
(Continued)

OTHER PUBLICATIONS

"International Search Report (Form PCT/ISA/210)", dated Jun. 15, 2015, with English translation thereof, pp. 1-4.

*Primary Examiner* — Lee E Sanderson
*Assistant Examiner* — Michael C. Romanowski
(74) *Attorney, Agent, or Firm* — JCIPRNET

(57) ABSTRACT

A seismic steel tubular column with internal local restraint and filled with high-strength compound concrete containing normal-strength demolished concrete lumps, and a construction process. The seismic column includes a steel tube (1), high-strength fresh concrete (2), normal-strength demolished concrete lumps (3), horizontal stirrups (4), and longitudinal erection bars (5). The horizontal stirrups (4) are arranged at upper and lower ends inside the steel tube (1). The high-strength fresh concrete (2) is poured and the
(Continued)

normal-strength demolished concrete lumps (3) are put alternately inside the steel tube (1). A compressive strength of the high-strength fresh concrete (2) is 30~90 MPa greater than that of the normal-strength demolished concrete lumps (3).

5 Claims, 3 Drawing Sheets

(51) Int. Cl.
*C04B 18/16* (2006.01)
*B28B 1/08* (2006.01)
*B28B 1/16* (2006.01)
*C04B 28/02* (2006.01)
*E04H 9/02* (2006.01)

(52) U.S. Cl.
CPC ............... *C04B 28/02* (2013.01); *E04C 3/34* (2013.01); *C04B 2201/50* (2013.01); *C04B 2201/52* (2013.01); *E04H 9/021* (2013.01); *Y02W 30/95* (2015.05)

(58) Field of Classification Search
USPC .......................................... 52/834; 428/34.4
See application file for complete search history.

(56) References Cited

FOREIGN PATENT DOCUMENTS

| | | | | |
|---|---|---|---|---|
| CN | 101818543 | * | 9/2010 | ............... E04B 1/30 |
| CN | 201883609 | | 6/2011 | |
| CN | 202324344 | | 7/2012 | |
| DE | 2524147 | | 12/1976 | |
| JP | H07279312 | | 10/1995 | |
| JP | 2001233657 | | 8/2001 | |

* cited by examiner

SEISMIC STEEL TUBULAR COLUMN WITH INTERNAL LOCAL RESTRAINT AND FILLED WITH HIGH-STRENGTH COMPOUND CONCRETE CONTAINING NORMAL-STRENGTH DEMOLISHED CONCRETE LUMPS AND CONSTRUCTION PROCESS OF SUCH COLUMN

TECHNICAL FIELD

The present invention relates to the technical field of cyclic utilization of waste concrete and in particular, to a seismic steel tubular column with internal local restraint and filled with high-strength compound concrete containing normal-strength demolished concrete lumps and a construction process of such column.

BACKGROUND

Concrete-filled steel tubular column is a very reasonable composite member, which is widely used in the field of civil engineering and construction. On one hand, production of the concrete-filled steel tubular column requires no template, which improves the efficiency of construction; on the other hand, the seismic performance of the concrete-filled steel tubular column is superior to the conventional steel reinforced concrete column. A large number of earthquake damage investigations and experimental studies found that, earthquake damage to the concrete-filled steel tubular column is mainly concentrated at upper and lower ends of the column, while the rest of the column shaft is essentially intact, that is, material performance of the column shaft is not displayed in full strength. Therefore, in the case of amount of steel remains the same, the concrete-filled steel tubular column may be further optimized by adjusting material layout (i.e. increasing the proportion of steel consumed to the upper and lower ends of the column, while decreasing the proportion of steel consumed to the most of rest column shaft), and thereby its seismic performance is improved, but such technology is rarely seen by now.

Since natural sand and gravel mining destroys the environment and the reserves are dwindling, waste concrete, as a valuable "special resource", its recycle use has attracted more and more attention at home and abroad. However, the waste concrete is obtained by demolishing the constructions built in earlier years, and strength grade is generally low. In the past the waste concrete was only used with fresh concrete with close strength grade, with range of application being subjected to great restraints (for example, cannot be directly applied to high-level, heavy load and other structures), so how to effectively expand the range of application of normal-strength demolish concrete is an urgent problem to be solved. The present invention has found that using a mixture of normal-strength demolished concrete lumps and high-strength fresh concrete can yet be regarded as an effective way to solve this problem.

To sum up, problems exist in the prior art, such as material layout of the seismic concrete-filled steel tubular column being not reasonable enough and the range of application of the normal-strength demolished concrete being urgent to expand.

SUMMARY OF THE INVENTION

The object of the present invention is to overcome the deficiencies of the prior art, providing a seismic steel tubular column with internal local restraint and filled with high-strength compound concrete containing normal-strength demolished concrete lumps, and a construction process. On one hand, by means of appropriately reducing steel tube wall thickness of the concrete-filled steel tubular column, while strengthening a horizontal restraint of upper and lower ends of the column, seismic performance of the column is significantly improved in the case of same amount of steel; on the other hand, by means of using a mixture of normal-strength demolished concrete lumps and high-strength fresh concrete, the former may be applied to a member or structure requiring higher concrete strength, and thereby range of application of the normal-strength demolished concrete is greatly expanded.

The technical solution adopted in the present invention to achieve the above mentioned object is as follows:

A seismic steel tubular column with internal local restraint and filled with high-strength compound concrete containing normal-strength demolished concrete lumps, horizontal stirrups are provided at upper and lower ends inside a steel tube, with the steel tube having a circular or polygonal section. The horizontal stirrups corresponding to the circular section are uniformly arranged in one-seventh of a height range at the lower end of the steel tube and in one-seventh of a height range at the upper end of the steel tube respectively, while the horizontal stirrups corresponding to the polygonal section are uniformly arranged in one-fifth of a height range at the lower end of the steel tube and in one-fifth of a height range at the upper end of the steel tube respectively. High-strength fresh concrete is poured and normal-strength demolished concrete lumps are put alternately inside the steel tube, with a compressive strength of the high-strength fresh concrete being 30-90 MPa greater than that of the normal-strength demolished concrete.

Further optimized for implementation, the normal-strength demolished concrete lumps are waste concrete lumps after demolishing old buildings, structures, roads, bridges or dams and removing protective layers and all or part of steel reinforcements.

Further optimized for implementation, the high-strength fresh concrete is a natural aggregate concrete or a recycled aggregate concrete, and has a compressive strength no less than 60 MPa.

Further optimized for implementation, the normal-strength demolished concrete lump has a characteristic size no less than 100 mm, and a mass ratio of the normal-strength demolished concrete lump and the high-strength fresh concrete is 1:4-1:1.

A construction process of the above described seismic steel tubular column with internal local restraint and filled with high-strength compound concrete containing normal-strength demolished concrete lumps, which comprises following steps:

(1) spot welding a plurality of horizontal stirrups and two longitudinal erection bars into one, then lifting the two longitudinal erection bars, uniformly arranging the plurality of horizontal stirrups in one-seventh of a height range at a lower end and in one-seventh of a height range at an upper end inside a steel tube respectively when the steel tube has a circular section, and uniformly arranging the plurality of horizontal stirrups in one-fifth of the height range at the lower end and in one-fifth of the height range at the upper end inside the steel tube respectively when the steel tube has a polygonal section, then spot welding the two longitudinal erection bars with an inner wall of the steel tube;

(2) frilly wetting normal-strength demolished concrete lumps in advance, when putting, pouring high-strength fresh concrete with about 20 mm thickness into a bottom of the steel tube first, then alternately putting wet normal-strength demolished concrete lumps and the high-strength fresh concrete inside the steel tube and frilly vibrating until pouring is finished, so that the normal-strength demolished concrete lumps and the high-strength fresh concrete are uniformly mixed into one.

Compared with the prior arts, the present invention has following advantages:

(1) By means of arranging horizontal stirrups at upper and lower ends inside a steel tube respectively, which further strengthens end restraint of a concrete-filled steel tubular column, seismic performance of the concrete-filled steel tubular column is significantly improved in the case of same amount of steel.

(2) Utilizing normal-strength demolished concrete lumps and high-strength fresh concrete to produce a steel tubular column filled with high strength compound concrete containing normal-strength demolished concrete lumps may apply the normal-strength demolished concrete to a member or structure requiring higher concrete strength, which expands range of application of the normal-strength demolished concrete.

(3) Using the demolished concrete lumps for pouring greatly simplifies treating processes such as crushing, screening and purifying during cyclic utilization of the waste concrete, which saves a large amount of manpower, time and energy, and may realize effective cyclic utilization of the waste concrete.

DETAILED DESCRIPTION OF THE PREFERRED EMBODIMENT

The present invention is further described in detail below in combination with embodiments and accompanying drawings, but implementations of the present invention are not limited thereto.

Embodiment 1

Figure 1A:
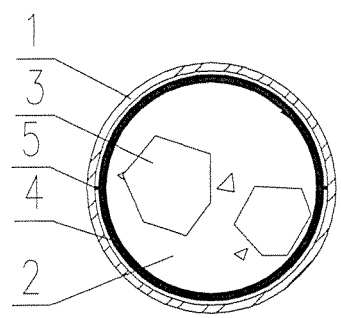
FIG. 1a and FIG. 1b are schematic views of transverse section and longitudinal section of the seismic steel tubular column with internal local restraint and filled with high-strength compound concrete containing normal-strength demolished concrete lumps according to Embodiment 1, respectively.
Figure 1B:
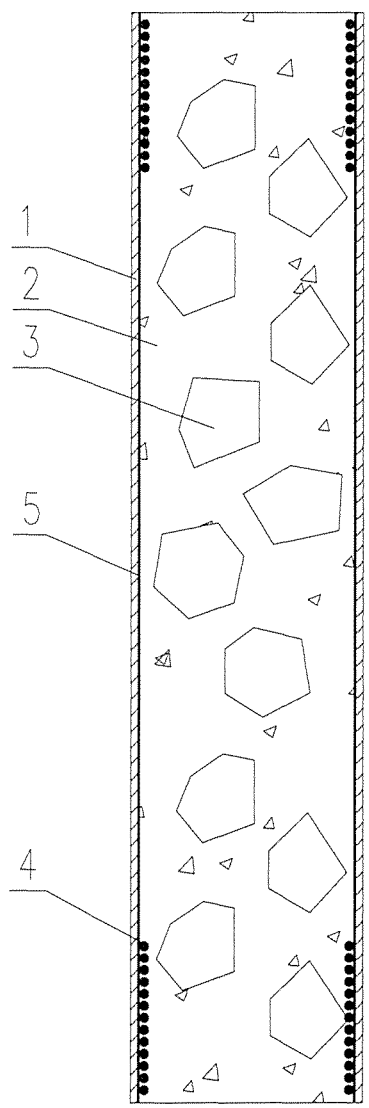

See FIG. 1a and FIG. 1b, a seismic steel tubular column with internal local restraint and filled with high-strength compound concrete containing normal-strength demolished concrete lumps according to the present invention comprising a steel tube 1, high-strength fresh concrete 2, normal-strength demolished concrete lumps 3, horizontal stirrups 4, and longitudinal erection bars 5. The steel tube has a circular section, with an outer diameter of 300 mm, a wall thickness of 5 mm, a steel tube length of 3000 mm, designation of steel of Q235, measured yield strength of 269.8 MPa, and a tensile strength of 407.7 MPa. Fresh concrete with a strength grade of 70 MPa is poured and demolished concrete lumps with a strength grade of 30 MPa are put alternately inside the steel tube. A compressive strength of the high-strength fresh concrete is 40 MPa greater than that of the normal-strength demolished concrete. After the high-strength fresh concrete is combined with normal-strength demolished concrete, the compressive strength is 48.8 MPa. 13 horizontal stirrups are uniformly arranged in one-seventh of a height range at a lower end of the steel tube and 13 horizontal stirrups are uniformly arranged in one-seventh of a height range at an upper end of the steel tube. The stirrup adopts HRB335-grade steel reinforcement with a diameter of 12 mm, and a stirrup distance is 33 mm. The longitudinal erection bar adopts HRB335-grade steel reinforcement with a diameter of 8 mm, having a length of 3000 mm. The normal-strength demolished concrete lumps are waste concrete lumps after demolishing an old building and removing protective layers and all steel reinforcements. The high-strength fresh concrete is a natural aggregate concrete. The normal-strength demolished concrete lump has a characteristic size of 100-200 mm, and a mass ratio of the normal-strength demolished concrete lump and the high-strength fresh concrete is 1:1.5.

A construction process of the above described seismic steel tubular column with internal local restraint and filled with high-strength compound concrete containing normal-strength demolished concrete lumps, which comprises following steps:

(1) spot welding 26 horizontal stirrups and two longitudinal erection bars into one, then lifting the two longitudinal erection bars, arranging 13 horizontal stirrups in one-seventh of a height range at a lower end inside a steel tube, and arranging the other 13 horizontal stirrups in one-seventh of a height range at an upper end, then spot welding the two longitudinal erection bars with an inner wall of the steel tube;

(2) fully wetting normal-strength demolished concrete lumps in advance, when putting, pouring high-strength fresh concrete with about 20 mm thickness into a bottom of the steel tube first, then alternately putting wet normal-strength demolished concrete lumps and the high-strength fresh concrete inside the steel tube and fully vibrating until pouring is finished, so that the normal-strength demolished concrete lumps and the high-strength fresh concrete are uniformly mixed into one.

A circular steel tube with an outer diameter of 300 mm, a wall thickness of 6 mm, a length of 3000 mm and same materials is taken at the same time, without arranging horizontal stirrup, to produce a steel tubular column without local restraint and filled with high-strength compound concrete containing normal-strength demolished concrete lumps. It is found that the seismic steel tubular column with internal local restraint and filled with high-strength compound concrete containing normal-strength demolished concrete lumps in the present embodiment has an ultimate displacement angle of about 5.2%, while steel tubular column without local restraint and filled with high-strength compound concrete containing normal-strength demolished concrete lumps has an ultimate displacement angle of about 4.4%, both of which fully meet the limitation requirements of current seismic codes about interlayer displacement angle of frame column. By calculating, it can be seen that amount of steel of these two columns is almost the same, but seismic performance of the former is about 18% higher than the latter.

Embodiment 2

Figure 2A:
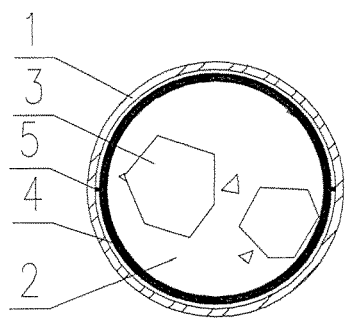
FIG. 2a and FIG. 2b are schematic views of transverse section and longitudinal section of the seismic steel tubular column with internal local restraint and filled with high-strength compound concrete containing normal-strength demolished concrete lumps according to Embodiment 2, respectively.
Figure 2B:
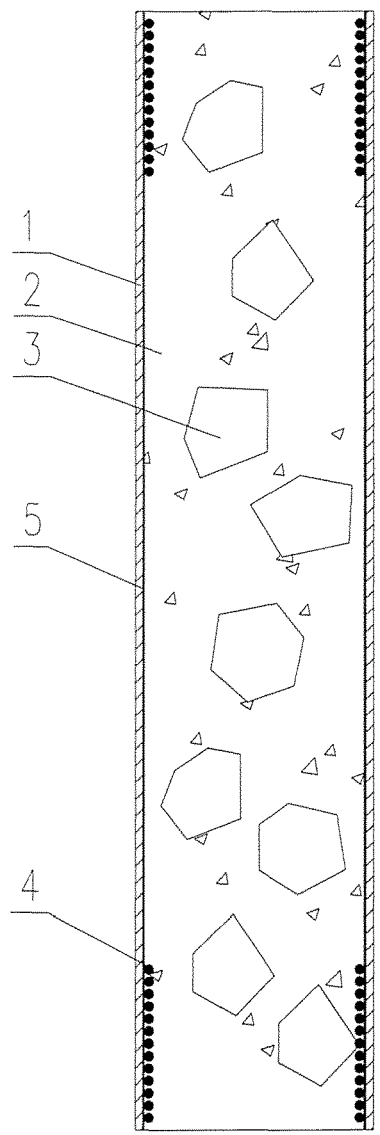

See FIG. 2a and FIG. 2b, a seismic steel tubular column with internal local restraint and filled with high-strength compound concrete containing normal-strength demolished concrete lumps according to the present invention comprising a steel tube 1, high-strength fresh concrete 2, normal-strength demolished concrete lumps 3, horizontal stirrups 4, and longitudinal erection bars 5. The steel tube has a circular section, with an outer diameter of 300 mm, a wall thickness of 5 mm, a steel tube length of 3000 mm, designation of steel of Q235, measured yield strength of 269.8 MPa, and a tensile strength of 407.7 MPa. Fresh concrete with a strength grade of 110 MPa is poured and demolished concrete lumps with a strength grade of 30 MPa are put alternately inside the steel tube. A compressive strength of the high-strength fresh concrete is 80 MPa greater than that of the normal-strength demolished concrete. After the high-strength fresh concrete combines with the normal-strength demolished concrete, the compressive strength is 66.7 MPa. 13 horizontal stirrups are uniformly arranged in one-seventh of a height range at a lower end of the steel tube and 13 horizontal stirrups are uniformly arranged in one-seventh of a height range at an upper end of the steel tube. The stirrup adopts HRB335-grade steel reinforcement with a diameter of 12 mm, and a stirrup distance is 33 mm. The longitudinal erection bar adopts HRB335-grade steel reinforcement with a diameter of 8 mm, having a length of 3000 mm. The normal-strength demolished concrete lumps are demolished concrete lumps after demolishing an old building and removing protective layers and all steel reinforcements. The high-strength fresh concrete is a natural aggregate concrete. The normal-strength demolished concrete lump has a characteristic size of 100-200 mm, and a mass ratio of the normal-strength demolished concrete lump and the high-strength fresh concrete is 1:2.

A construction process of the above described seismic steel tubular column with internal local restraint and filled with high-strength compound concrete containing normal-strength demolished concrete lumps, which comprises following steps:

(1) spot welding 26 horizontal stirrups and two longitudinal erection bars into one, then lifting the two longitudinal erection bars, arranging 13 horizontal stirrups in one-seventh of a height range at a lower end inside a steel tube, and arranging the other 13 horizontal stirrups in one-seventh of a height range at an upper end, then spot welding the two longitudinal erection bars with an inner wall of the steel tube;

(2) fully wetting normal-strength demolished concrete lumps in advance, when putting, pouring high-strength fresh concrete with about 20 mm thickness into a bottom of the steel tube first, then alternately putting wet normal-strength demolished concrete lumps and the high-strength fresh concrete inside the steel tube and fully vibrating until pouring is finished, so that the normal-strength demolished concrete lumps and the high-strength fresh concrete are uniformly mixed into one.

A circular steel tube with an outer diameter of 300 mm, a wall thickness of 6 mm, a length of 3000 mm and same materials is taken at the same time, without arranging horizontal stirrup, to produce a steel tubular column without local restraint and filled with high-strength compound concrete containing normal-strength demolished concrete lumps. It is found that the seismic steel tubular column with internal local restraint and filled with high-strength compound concrete containing normal-strength demolished concrete lumps in the present embodiment has an ultimate displacement angle of about 5.0%, while the steel tubular column without local restraint and filled with high-strength compound concrete containing normal-strength demolished concrete lumps has an ultimate displacement angle of about 4.1%, both of which fully meet the limitation requirements of current seismic codes about interlayer displacement angle of frame column. By calculating, it can be seen that amount of steel of these two columns is almost the same, but seismic performance of the former is about 22% higher than the latter.

Embodiment 3

Figure 3A:
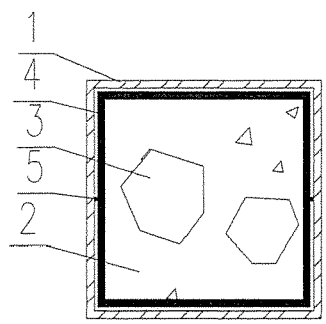
FIG. 3a and FIG. 3b are schematic views of transverse section and longitudinal section of the seismic steel tubular column with internal local restraint and filled with high-strength compound concrete containing normal-strength demolished concrete lumps according to Embodiment 3, respectively.
Figure 3B:
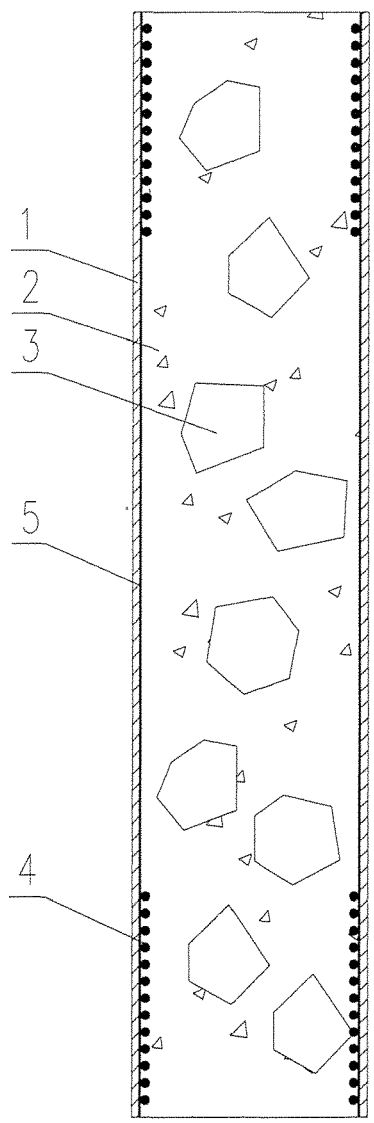

See FIG. 3a and FIG. 3b, a seismic steel tubular column with internal local restraint and filled with high-strength compound concrete containing normal-strength demolished concrete lumps according to the present invention comprising a steel tube 1, high-strength fresh concrete 2, normal-strength demolished concrete lumps 3, horizontal stirrup 4, and longitudinal erection bars 5. The steel tube has a rectangular section, with a side length of 300 mm, a wall thickness of 5 mm, a steel tube length of 3000 mm, designation of steel of Q235, measured yield strength of 269.8 MPa, and a tensile strength of 407.7 MPa. Fresh concrete with a strength grade of 110 MPa is poured and demolished concrete lumps with a strength grade of 20 MPa are put alternately inside the steel tube. A compressive strength of the high-strength fresh concrete is 90 MPa greater than that of the normal-strength demolished concrete. After the high-strength fresh concrete combines with the normal-strength demolished concrete, the compressive strength is 57.5 MPa. 13 horizontal stirrups are uniformly arranged in one-fifth of a height range at a lower end of the steel tube and 13 horizontal stirrups are uniformly arranged in one-fifth of a height range at an upper end of the steel tube. The stirrup adopts HRB335-grade steel reinforcement with a diameter of 12 mm, and a stirrup distance is 46 mm. The longitudinal erection bar adopts HRB335-grade steel reinforcement with a length of 8 mm, having a length of 3000 mm. The normal-strength demolished concrete lumps are demolished concrete lumps after demolishing an old building and removing protective layers and all steel reinforcements. The high-strength fresh concrete is a natural aggregate concrete. The normal-strength demolished concrete lump has a characteristic size of 100-200 mm, and a mass ratio of the normal-strength demolished concrete bulk and the high-strength fresh concrete is 1:2.

A construction process of the above described seismic steel tubular column with internal local restraint and filled with high-strength compound concrete containing normal-strength demolished concrete lumps, which comprises following steps:

(1) spot welding 26 horizontal stirrups and two longitudinal erection bars into one, then lifting the two longitudinal erection bars, arranging 13 horizontal stirrups in one-fifth of a height range at a lower end inside a steel tube, and arranging the other 13 horizontal stirrups in one-fifth of a height range at an upper end, then spot welding the two longitudinal erection bars with an inner wall of the steel tube;

(2) fully wetting normal-strength demolished concrete lumps in advance, when putting, pouring high-strength fresh concrete with about 20 mm thickness into a bottom of the steel tube first, then alternately putting wet normal-strength demolished concrete lumps and the high-strength fresh concrete inside the steel tube and fully vibrating until pouring is finished, so that the normal-strength demolished concrete lumps and the high-strength fresh concrete are uniformly mixed into one.

A rectangular steel tube with a side length of 300 mm, a wall thickness of 6 mm, a length of 3000 mm and same materials is taken, without arranging horizontal stirrup, to product a steel tubular column without local restraint and filled with high-strength compound concrete containing normal-strength demolished concrete lumps. It is found that the seismic steel tubular column with internal local restraint and filled with high-strength compound concrete containing normal-strength demolished concrete lumps in the present embodiment has an ultimate displacement angle of about 4.6%, while the steel tubular column without local restraint and filled with high-strength compound concrete containing normal-strength demolished concrete lumps has an ultimate displacement angle of about 3.8%, both of which fully meet the limitation requirements of current seismic codes about interlayer displacement angle of frame column. By calculating, it can be seen that amount of steel of these two columns is almost the same, but seismic performance of the former is about 21% higher than the latter.

The above are preferred implementations of the present invention, but the implementations of the present invention are not limited by the above content. Any other changes, modifications, substitutions, combinations and simplifications that are not deviated from the spirit and principles of the present invention should be equivalent replacements, which are included within the scope of protection of the present invention

What is claimed:

1. A seismic steel tubular column with internal local restraint and filled with high-strength compound concrete containing demolished concrete lumps, comprising:
    a steel tube;
    horizontal stirrups, wherein the horizontal stirrups are arranged at upper and lower ends inside the steel tube, with the steel tube having a circular or polygonal cross section, and the horizontal stirrups corresponding to the circular cross section are uniformly arranged and more concentrated in one-seventh of a height range from the lower end of the steel tube and in one-seventh of a height range from the upper end of the steel tube respectively than other areas of the steel tube, while the horizontal stirrups corresponding to the polygonal cross section are uniformly arranged and more concentrated in one-fifth of a height range from the lower end of the steel tube and in one-fifth of a height range from the upper end of the steel tube respectively than other areas of the steel tube; and
    high-strength fresh concrete, wherein the high-strength fresh concrete and the demolished concrete lumps are mixed and arranged inside the steel tube, with a compressive strength of the high-strength fresh concrete being 30-90 MPa greater than a compressive strength of the demolished concrete lumps,
    wherein the height range is the distance between the lower end of the steel tube and the upper end of the steel tube.

2. The seismic steel tubular column with internal local restraint and filled with high-strength compound concrete containing demolished concrete lumps according to claim 1, wherein the demolished concrete lumps are waste concrete lumps from demolished old buildings, structures, roads, bridges or dams and protective layers and all or part of steel reinforcements in the waste concrete lumps have been removed.

3. The seismic steel tubular column with internal local restraint and filled with high-strength compound concrete containing demolished concrete lumps according to claim 1, wherein the high-strength fresh concrete is a natural aggregate concrete or a recycled aggregate concrete, and has a compressive strength no less than 60 MPa.

4. The seismic steel tubular column with internal local restraint and filled with high-strength compound concrete containing demolished concrete lumps according to claim 1, wherein the demolished concrete lumps have a characteristic size no less than 100 mm, and a mass ratio of the demolished concrete lumps and the high-strength fresh concrete is 1:4-1:1.

5. A construction process of the seismic steel tubular column with internal local restraint and filled with high-strength compound concrete containing demolished concrete lumps according to claim 1, characterized in that it comprises the following steps:
    (1) spot welding a plurality of horizontal stirrups and two longitudinal erection bars into one, then lifting the two longitudinal erection bars, uniformly arranging the plurality of horizontal stirrups in one-seventh of a height range at a lower end and in one-seventh of a height range at an upper end inside a steel tube respectively when the steel tube has a circular cross section, and uniformly arranging the plurality of horizontal stirrups in one-fifth of the height range at the lower end and in one-fifth of the height range at the upper end inside the steel tube respectively when the steel tube has a polygonal cross section, then spot welding the two longitudinal erection bars to the inner wall of the steel tube;
    (2) fully wetting demolished concrete lumps in advance, pouring high-strength fresh concrete with about 20 mm thickness into a bottom of the steel tube first, then alternately putting wet demolished concrete lumps and the high-strength fresh concrete inside the steel tube and fully vibrating until pouring is finished, so that the demolished concrete lumps and the high-strength fresh concrete are uniformly mixed.

* * * * *